United States Patent [19]

Mohn

[11] Patent Number: 4,995,986

[45] Date of Patent: Feb. 26, 1991

[54] WASTEWATER TREATMENT USING MAGNESIUM SILICATE

[75] Inventor: Michael F. Mohn, Levittown, Pa.

[73] Assignee: Betz Laboratories, Inc., Trevose, Pa.

[21] Appl. No.: 566,647

[22] Filed: Aug. 13, 1990

[51] Int. Cl.$^5$ .............................................. C02F 1/56
[52] U.S. Cl. .................................. 210/717; 210/727; 210/736
[58] Field of Search .............. 210/707, 716, 717, 723, 210/724, 726–728, 736

[56] References Cited

U.S. PATENT DOCUMENTS

| | | | |
|---|---|---|---|
| 4,200,527 | 4/1980 | Cassella et al. | 210/724 |
| 4,200,528 | 4/1980 | Cassella et al. | 210/724 |
| 4,525,281 | 6/1985 | Cooper | 210/728 |
| 4,765,908 | 8/1988 | Monick et al. | 210/728 |
| 4,923,629 | 5/1990 | Hasegawa et al. | 210/716 |

Primary Examiner—Tom Wyse
Attorney, Agent, or Firm—Gergory M. Hill

[57] ABSTRACT

An improved method for removing contaminants from industrial, municipal or food processing wastewater systems comprising generating amorphous precipitated magnesium silicate by separately adding aqueous solutions of magnesium chloride and sodium silicate.

9 Claims, No Drawings

WASTEWATER TREATMENT USING MAGNESIUM SILICATE

FIELD OF THE INVENTION

The present invention relates to wastewater treatment programs. Specifically, it addresses the problems associated with the removal of pollutants and contaminants from water used in or expelled from industrial or food processing operations.

BACKGROUND OF THE INVENTION

Many industrial, manufacturing and food processing operations utilize water for the purposes of cleaning or cooling the equipment employed and products produced by these operations. While attempts may be made to clean the water before it is released into the environment, many contaminants such as oils, organic compounds and/or dissolved metals remain. Historical methods of treatment have included the use of solid materials such as clay and activated charcoal for use as adsorbants of these contaminants.

Other treatment programs have been developed over the years but they contain undesirable side-effects. Compounds such as aluminum sulfate and ferric chloride have exhibited some degree of success in removing certain types of water-borne contaminants.

However, they are acidic and, as a result, are corrosive to the metallic surfaces in contact with this water system. Additionally, water soluble aluminum is regarded as a health threat to both animals and man. Therefore, its presence in any aqueous system which is released into the environment is undesirable. This is also a critical issue in food processing operations in which recovery processes are utilized to generate animal food supplements such as proteins and animal fats.

Effective wastewater treatment programs exhibiting minimal side-effects involve the use of magnesium silicate. This compound is added to the water system to be treated as a powdered solid or as a crystalline mineral variation thereof, such as talc or asbestos. Although magnesium silicate may be desirable from the perspective of efficacy and having minimal side-effects, conventional methods of handling the compound create additional problems. The necessity of having to handle the powders often results in the generation of unwanted dust contamination. Feeding powders into the water system to be treated often causes arcing or bridging in the funnel feeders as well as powder caking, a poorly dispersed mass of compound, which can abrade or plug up piping, valves and other equipment systems.

It is an object of the present invention to provide an effective wastewater treatment program which avoids the use of toxic substances. It is a further object to provide an effective magnesium silicate program without having the undesirable consequences of consequences of having to deal with a powder or fine crystalline compound.

PRIOR ART

U.S. Pat. No. 4,200,527, Cassella et al. discloses the use of magnesium silicate to flocculate suspended solids from an exhausted chrome tanning bath while retaining the chrome in solution. Similarly related, U.S. Pat. No. 4,200,528, to the same inventors, teaches a process using magnesium silicate whereby chrome values are removed from the effluent water of a tanning operation prior to discharge into the environment.

SUMMARY OF THE INVENTION

The generation of amorphous precipitated magnesium silicate in-situ is an effective and efficient method for the treatment and removal of pollutants from contaminated water. The present invention consists of adding two liquid products to the water to be treated. In the water, these two products react to generate a precipitated magnesium silicate. This precipitate is more effective at removing pollutants than are processes in which solid powders are added because of the dynamics of several resulting adsorption/neutralization mechanisms.

One such process is coagulation, which results from the charge neutralization of the negatively charged pollutant surface by the divalent magnesium cation. Another mechanism which operates contemporaneously with the charge neutralization process involves the actual process of forming the magnesium silicate precipitate. A clear advantage evident from using an in-situ precipitate forming process is that otherwise charge stable pollutant particles are removed from solution by the formation of the solid precipitate matrix which forms around the particles and encapsulates them. As the solid precipitated matrix settles, the contaminants, which are either adsorbed onto or encapsulated by the precipitate, are then easily removed from the water system.

DETAILED DESCRIPTION OF THE INVENTION

The formation of amorphous precipitated magnesium silicate within a contaminated water system is achieved by the separate addition to this system of two precursor compounds dissolved in water to form water soluble solutions. One solution consists of magnesium chloride brine. This solution is commercially available under the tradename DusTop, available from Kaiser Chemical Co. This particular solution contains 30% by weight magnesium chloride in water.

The second liquid precursor consists of an aqueous solution of sodium silicate. A characteristic product is available under the tradename Silicate N, available from PQ Corp., and contains a blend of $SiO_2$ and $Na_2O$ in a respective weight ratio of 3.22 to 1.

Each precursor solution is added to the water system to be treated in an amount sufficient to effectively remove contaminants therefrom. Generally, the solution containing magnesium chloride should be added so that its concentration is between 50 to 22,000 parts per million parts of water. The concentration of sodium silicate is generally between 30 and 10,000 parts per million parts of water. It is more desirable to add more magnesium chloride than sodium silicate but specific concentrations will depend upon the degree and type of contamination present in the water system. The amounts of each precursor must be optimized accordingly.

The process of treating a water system with magnesium silicate according to the present invention also improves the performance of other known organic water treatment flocculant polymers. Such polymers include, but are not limited to, the following:

| Polymer | Description |
|---|---|
| I | Condensation product of epichlorohydrin plus dimethyl- |

| Polymer | Description |
|---|---|
| | amine, available from Betz Laboratories, Inc., as Betz Polymer 1190. |
| II | Diallyldimethylammonium chloride, available from CPS Chemical Company as Ageflex. |
| III | Condensation product of ethylenediamine plus dimethylamine plus epichlorohydrin, available from American Cyanamid as Magnifloc 581C. |
| IV | Condensation product of diethylenetriamine plus adipic acid plus epichlorohydrin, available from Betz Laboratories, Inc., as Betz Polymer 1175. |

The treatment program of the present invention is directed toward Water Systems containing contaminants such as oils, humic materials, organic compounds and dissolved metals. However, this list is not intended to limit the type of pollutants which may be treated since it is contemplated that the specific treatment program may be utilized to treat water systems containing many different pollutants. Water systems which may be treated by the present invention include effluent wastewater from industrial, municipal or food processing operations.

EXAMPLES

The following examples illustrate the effectiveness of the present invention. A variety of contaminated water was used. The specific contamination treated is indicated in the heading of each table.

The sample procedure involved adding the contaminated water to be treated to standard laboratory sample jars. The selected treatment was then added to a single jar after which turbidity was measured. Treatment efficacy is determined by the turbidity of the post treatment water. The lower the turbidity, as measured in conventional NTU values the more efficient the treatment program. Poor treatments or treatments having no effect at all are indicated as having values greater than 200. The turbidimeter does not provide quantitative values above 200.

Table I shows the results of various treatments on oil contaminated wastewater acquired from a domestic pipe manufacturing facility, U.S. Pipe Company, Burlington, N.J.

TABLE I

Oily Wastewater - U.S. Pipe

| Chemical Treatment | Turbidity NTU |
|---|---|
| Control (no treatment) | >200 |
| 25 ppm Polymer III | >200 |
| 100 ppm Polymer III | >200 |
| 200 ppm Polymer III | >200 |
| 400 ppm Polymer III | >200 |
| 750 ppm Polymer III | >200 |
| 1,000 ppm Polymer III | >200 |
| 1,500 ppm Polymer III | >200 |
| 2,000 ppm Polymer III | >200 |
| 3,000 ppm Polymer III | >200 |
| 4,000 ppm Polymer III | >200 |
| 5,000 ppm Polymer III | >200 |
| 2,100 ppm $MgCl_2$ | >200 |
| 2,100 ppm $MgCl_2$ + 300 ppm Silicate | 72 |
| 2,100 ppm $MgCl_2$ + 600 ppm Silicate | 38 |
| 2,100 ppm $MgCl_2$ + 900 ppm Silicate | 39 |
| 2,100 ppm $MgCl_2$ + 1200 ppm Silicate | 37 |
| 2,100 ppm $MgCl_2$ + 1500 ppm Silicate | 38 |
| 2,100 ppm $MgCl_2$ + 1800 ppm Silicate | 52 |
| 2,100 ppm $MgCl_2$ + 2100 ppm Silicate | 143 |
| 210 ppm $MgCl_2$ + 60 ppm Silicate | >200 |
| 525 ppm $MgCl_2$ + 150 ppm Silicate | >200 |
| 1,050 ppm $MgCl_2$ + 300 ppm Silicate | >200 |
| 1,575 ppm $MgCl_2$ + 450 ppm Silicate | 45 |
| 2,100 ppm $MgCl_2$ + 600 ppm Silicate | 16 |
| 2,625 ppm $MgCl_2$ + 750 ppm Silicate | 14 |
| 3,150 ppm $MgCl_2$ + 900 ppm Silicate | 16 |
| 3,675 ppm $MgCl_2$ + 1050 ppm Silicate | 13 |
| 4,200 ppm $MgCl_2$ + 1200 ppm Silicate | 14 |
| 250 ppm Polymer III + 1000 ppm $MgCl_2$ + 285 ppm Silicate | >200 |
| 250 ppm Polymer III + 1000 ppm $MgCl_2$ + 1000 ppm Silicate | 56 |
| 250 ppm Polymer III + 500 ppm $MgCl_2$ + 500 ppm Silicate | 28 |
| 250 ppm Polymer III + 1000 ppm $MgCl_2$ + 500 ppm Silicate | 14 |

Note:
$MgCl_2$ consisted of a 30% solution by weight of $MgCl_2$ in water
The silicate used was composed of a 3.22/1 ratio by weight of $SiO_2/Na_2O$
These same treatment chemicals were used throughout the remaining examples and tables shown herein below.

As part of the compilation of the data presented in Table I, the optimum ratio of $MgCl_2$ to silicate was sought. While maintaining the concentration of $MgCl_2$ constant at 2100 ppm, the concentration of silicate was varied from 300 to 2100 ppm. As can be seen, a range for the optimum concentration ratio of $MgCl_2$ to silicate for this specific substrate was determined to be between about 1.0 to 1.0 and about 7.0 to 1.0. With the optimum ratio of 3.5 to 1.0 selected, the total dosage was varied to determine the optimum treatment. As is evident, the most efficacious treatments for this substrate ranged from 2100 ppm $MgCl_2$:600 ppm silicate to 4200 ppm $MgCl_2$:1200 ppm silicate.

Tables II and III show data compiled using oily wastewater from a different metal fabricating facility, Pre-Finish Metals Inc., Morrisville, PA. The wastewater used to generate the results in Table II was obtained after the metal cleaning phase and contained a mixture of caustic, surfactants and emulsified oils. Shortly after this phase, acid is added to the wastewater to help partially break the oil-in-water emulsion. The water used to generate data for Table III was obtained after the addition of the acid.

TABLE II

Oily Wastewater-PreFinish Metals Prior to Acid Addition

| Treatment Chemicals | Turbidity (NTU) |
| --- | --- |
| Control | >200 |
| 2,100 ppm $MgCl_2$ | >200 |
| 2,100 ppm $MgCl_2$ + 300 ppm Silicate | 191 |
| 2,100 ppm $MgCl_2$ + 600 ppm Silicate | 141 |
| 2,100 ppm $MgCl_2$ + 900 ppm Silicate | 121 |
| 2,100 ppm $MgCl_2$ + 1200 ppm Silicate | 137 |
| 2,100 ppm $MgCl_2$ + 1500 ppm Silicate | 131 |
| 2,100 ppm $MgCl_2$ + 1800 ppm Silicate | 158 |
| 2,100 ppm $MgCl_2$ + 2100 ppm Silicate | 164 |
| 3,500 ppm $MgCl_2$ + 1500 ppm Silicate | 40 |
| 4,000 ppm $MgCl_2$ + 1714 ppm Silicate | 34 |
| 5,000 ppm $MgCl_2$ + 2143 ppm Silicate | 24 |
| 6,000 ppm $MgCl_2$ + 2571 ppm Silicate | 23 |
| 10,000 ppm $MgCl_2$ + 4286 ppm Silicate | 8.2 |
| 200 ppm Polymer I + 1000 ppm $MgCl_2$ + 1000 ppm Silicate | 36 |
| 300 ppm Polymer I + 1000 ppm $MgCl_2$ + 1000 ppm Silicate | 1.5 |
| 400 ppm Polymer I + 1000 ppm $MgCl_2$ + 1000 ppm Silicate | 3.5 |
| 100 ppm Polymer I + 2000 ppm $MgCl_2$ + 2000 ppm Silicate | 30 |
| 200 ppm Polymer I + 2000 ppm $MgCl_2$ + 2000 ppm Silicate | 19 |
| 300 ppm Polymer I + 2000 ppm $MgCl_2$ + 2000 ppm Silicate | 10 |
| 400 ppm Polymer I + 2000 ppm $MgCl_2$ + 2000 ppm Silicate | 3.3 |
| 100 ppm Polymer I + 3000 ppm $MgCl_2$ + 3000 ppm Silicate | 20 |
| 200 ppm Polymer I + 3000 ppm $MgCl_2$ + 3000 ppm Silicate | 9 |
| 300 ppm Polymer I + 3000 ppm $MgCl_2$ + 3000 ppm Silicate | 6.6 |
| 400 ppm Polymer I + 3000 ppm $MgCl_2$ + 3000 ppm Silicate | 4.8 |

TABLE III

Oily Wastewater - Pre-Finish Metals After Acid Addition

| Treatment Chemicals | Turbidity (NTU) |
| --- | --- |
| Control | >200 |
| 21,000 ppm $MgCl_2$ | >200 |
| 21,000 ppm $MgCl_2$ + 3,000 ppm Silicate | >200 |
| 21,000 ppm $MgCl_2$ + 6,000 ppm Silicate | 39 |
| 21,000 ppm $MgCl_2$ + 9,000 ppm Silicate | 21 |
| 21,000 ppm $MgCl_2$ + 12,000 ppm Silicate | 20 |
| 21,000 ppm $MgCl_2$ + 15,000 ppm Silicate | 22 |
| 21,000 ppm $MgCl_2$ + 18,000 ppm Silicate | 18 |
| 21,000 ppm $MgCl_2$ + 21,000 ppm Silicate | 42 |
| 1,800 ppm $MgCl_2$ + 770 ppm Silicate | >200 |
| 2,400 ppm $MgCl_2$ + 1,028 ppm Silicate | >200 |
| 3,000 ppm $MgCl_2$ + 1,280 ppm Silicate | >200 |
| 9,000 ppm $MgCl_2$ + 3,850 ppm Silicate | 110 |
| 15,000 ppm $MgCl_2$ + 6,930 ppm Silicate | 57 |
| 21,000 ppm $MgCl_2$ + 9,000 ppm Silicate | 44 |
| 200 ppm Polymer I + 5,000 ppm $MgCl_2$ + 5,000 ppm Silicate | 115 |
| 200 ppm Polymer I + 10,000 ppm $MgCl_2$ + 10,000 ppm Silicate | 37 |
| 200 ppm Polymer I + 15,000 ppm $MgCl_2$ + 15,000 ppm Silicate | 12 |
| 300 ppm Polymer I + 5,000 ppm $MgCl_2$ + 5,000 ppm Silicate | 40 |
| 400 ppm Polymer I + 10,000 ppm $MgCl_2$ + 10,000 ppm Silicate | 21 |
| 100 ppm Polymer I + 15,000 ppm $MgCl_2$ + 15,000 ppm Silicate | 22 |
| 200 ppm Polymer I + 5,000 ppm $MgCl_2$ + 5,000 ppm Silicate | 44 |
| 300 ppm Polymer I + 10,000 ppm $MgCl_2$ + 10,000 ppm Silicate | 17 |
| 400 ppm Polymer I + 15,000 ppm $MgCl_2$ + 15,000 ppm Silicate | 29 |

An analysis of the concentration ratios and dosages was made to determine the optimum treatment conditions for the substrate used in Tables II and III. By a procedure identical to the one used in Table I, the $MgCl_2$ concentration was maintained constant and the silicate concentration was varied to determine the optimum ratio. This was found to be 2.33/1.0 based on the concentration of $MgCl_2$/silicate. Once this was established, the total dosage was varied to determine the optimum treatment for this substrate. For the substrate prior to acid addition, the optimum dosage was 10,000 ppm $MgCl_2$ with 4286 ppm silicate and for the same substrate after acid addition, the optimum dosage was 21,000 ppm $MgCl_2$ and 9,000 ppm silicate. As is evident from the results of Table I, II and III, the optimum ratio of $MgCl_2$ to silicate and the most efficacious dosage level is dependent upon the substrate to be treated.

The wastewater used to generate the data shown in Table IV was synthesized using a hydrocarbon oil containing about 8% anionic sursurfactant. It is commercially available under the tradename Coray 2. The treatment consisted of the addition of water soluble $MgCl_2$ and sodium silicate separately to the water.

TABLE IV

Synthetic Wastewater using 700 ppm Coray 2

| Treatment Chemicals | Turbidity (NTU) |
| --- | --- |
| Control | >200 |
| 500 ppm $MgCl_2$ + 500 ppm Silicate | >200 |
| 1,000 ppm $MgCl_2$ + 1,000 ppm Silicate | >200 |

TABLE IV-continued

Synthetic Wastewater using 700 ppm Coray 2

| Treatment Chemicals | Turbidity (NTU) |
| --- | --- |
| 1,500 ppm $MgCl_2$ + 1,500 ppm Silicate | >200 |
| 2,000 ppm $MgCl_2$ + 2,000 ppm Silicate | 164 |
| 2,400 ppm $MgCl_2$ + 2,400 ppm Silicate | 41 |

In order to show the superiority of the in-situ generation of magnesium silicate over the process of adding to the water system the pre-blended magnesium silicate a comparative test was conducted. Table V provides the results of that test conducted with various treatments as defined in the table in synthetic wastewater containing 700 ppm of the water soluble oil, Coray 2.

TABLE V

Comparative Test
In-Situ vs. Pre-blended Magnesium Silicate

| Treatment Chemicals | Turbidity (NTU) |
| --- | --- |
| Control | >200 |
| 2,500 ppm $MgCl_2$ + 1,500 ppm silicate | 2.0 |
| 4,000 ppm pre-blended magnesium silicate (solids unwashed during filtering process) | >200 |
| 4,000 ppm pre-blended magnesium silicate (solids washed during filtering process) | >200 |

In the above test, washing was performed to remove any residual soluble material. This had no effect on the efficacy of the product.

The above results clearly indicate that the in-situ generation of magnesium silicate is surprisingly more effective than adding the pre-blended solid form. Table VI provides data on the efficacies of various polymer flocculants alone and in combination with $MgCl_2$ and sodium silicate.

TABLE VI

Polymer Efficacies
Synthetic Wastewater using 700 ppm Coray 2

| Treatment Chemicals | Turbidity (NTU) |
| --- | --- |
| Control | >200 |
| 100 ppm Polymer I | >200 |
| 400 ppm Polymer I | >200 |
| 700 ppm Polymer I | >200 |
| 200 ppm Polymer I + 300 ppm $MgCl_2$ + 300 ppm Silicate | >200 |
| 200 ppm Polymer I + 500 ppm $MgCl_2$ + 500 ppm Silicate | 15.5 |
| 100 ppm Polymer II | >200 |
| 400 ppm Polymer II | >200 |
| 800 ppm Polymer II | >200 |
| 1000 ppm Polymer II | >200 |
| 300 ppm Polymer II + 300 ppm $MgCl_2$ + 300 ppm Silicate | >200 |
| 300 ppm Polymer II + 400 ppm $MgCl_2$ + 400 ppm Silicate | >200 |
| 300 ppm Polymer II + 500 ppm $MgCl_2$ + 500 ppm Silicate | 50 |
| 300 ppm Polymer II + 600 ppm $MgCl_2$ + 600 ppm Silicate | 35 |
| 300 ppm Polymer II + 700 ppm $MgCl_2$ + 700 ppm Silicate | 48 |
| 100 ppm Polymer III | >200 |
| 200 ppm Polymer III | >200 |
| 300 ppm Polymer III | >200 |
| 500 ppm Polymer III | >200 |
| 150 ppm Polymer III + 300 ppm $MgCl_2$ + 300 ppm Silicate | 71 |
| 150 ppm Polymer III + 400 ppm $MgCl_2$ + 400 ppm Silicate | 15 |
| 150 ppm Polymer III + 500 ppm $MgCl_2$ + 500 ppm Silicate | 20 |
| 150 ppm Polymer III + 600 ppm $MgCl_2$ + 600 ppm Silicate | 7.2 |
| 200 ppm Polymer III + 500 ppm $MgCl_2$ + 500 ppm Silicate | 70 |

The polymers indicated exhibit no quantifiable efficacy when used alone. However, when the $MgCl_2$ and sodium silicate are added efficacy improves. It is noteworthy that a synergistic effect results when 200 ppm of Polymer I is added to 500 ppm of $MgCl_2$ and 500 ppm of Silicate. At these concentrations both the polymer and the resulting magnesium silicate alone exhibit turbidity values in excess of 200 NTU. When combined, though, turbidity drops to an impressive 15.5.

While the invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What I claim is:

1. A method for removing contaminants from wastewater comprising generating amorphous precipitated magnesium silicate therein by adding to said wastewater a sufficient amount for the purpose of an aqueous solution of magnesium chloride and a sufficient amount for the purpose of an aqueous solution of sodium silicate.

2. The method of claim 1 wherein said contaminants are selected from the group consisting of oils, humic materials, organic compounds and dissolved metals.

3. The method of claim 1 wherein the concentration of said magnesium chloride added to said wastewater is between about 50 and 22,000 parts per million parts of water.

4. The method of claim 1 wherein the concentration of said sodium silicate added to said wastewater is between about 30 and 10,000 parts per million parts of water.

5. The method of claim 3 wherein said magnesium chloride is dissolved in water.

6. The method of claim 4 wherein said sodium silicate is a blend of $SiO_2$ and $Na_2O$.

7. The method of claim 1 further comprising adding to said wastewater an organic polymer.

8. The method of claim 7 wherein said organic polymer is selected from the group consisting of:

a condensation product of epichlorodydrin and dimethylamine, diallyldimethylammonium chloride, a condensation product of epichlorohydrin plus dimethylamine plus ethylenediamine, and a condensation product of diethylene triamine plus adipic acid plus epichlorohydrin.

9. The method of claim 1 wherein the ratio based on the concentration of magnesium chloride to sodium silicate is between about 7.0 to 1.0 and 1.0 to 1.0.

* * * * *